(12) United States Patent
Osterhout

(10) Patent No.: US 8,991,866 B2
(45) Date of Patent: Mar. 31, 2015

(54) VEHICLE PILLAR TRIM ASSEMBLY

(71) Applicant: Nissan North America, Inc., Franklin, TN (US)

(72) Inventor: Neal Osterhout, Macomb, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 13/919,326

(22) Filed: Jun. 17, 2013

(65) Prior Publication Data

US 2014/0367946 A1 Dec. 18, 2014

(51) Int. Cl.
*B60R 22/20* (2006.01)
*B60R 13/02* (2006.01)
*B60R 21/213* (2011.01)

(52) U.S. Cl.
CPC ............ *B60R 13/025* (2013.01); *B60R 22/201* (2013.01); *B60R 22/20* (2013.01); *B60R 21/213* (2013.01)
USPC ...................... 280/801.2; 280/730.2; 280/733; 280/728.2; 297/482; 297/483

(58) Field of Classification Search
CPC ...... B60R 22/18; B60R 22/20; B60R 22/201; B60R 22/206
USPC ............. 280/801.2, 804, 728.2, 728.3, 730.2, 280/733; 297/482, 483; 296/193.06
See application file for complete search history.

(56) References Cited

U.S. PATENT DOCUMENTS

| | | | |
|---|---|---|---|
| 4,465,303 A * | 8/1984 | Miki et al. .................... | 280/804 |
| 4,652,012 A | 3/1987 | Biller et al. | |
| 4,702,493 A * | 10/1987 | Escaravage ................ | 280/801.2 |
| 4,989,900 A | 2/1991 | Steinhuser | |
| 5,366,243 A | 11/1994 | Ray et al. | |
| 5,437,475 A | 8/1995 | Sugimoto | |
| 5,556,171 A * | 9/1996 | Busch ........................... | 297/483 |
| 5,609,367 A | 3/1997 | Eusebi et al. | |
| 5,655,793 A * | 8/1997 | Isonaga ...................... | 280/801.2 |
| 5,725,248 A * | 3/1998 | Inoue et al. ................. | 280/801.2 |
| 6,106,012 A * | 8/2000 | Boegge et al. ............ | 280/801.1 |
| 6,244,626 B1 * | 6/2001 | Monaghan et al. .......... | 280/805 |
| 6,276,720 B1 | 8/2001 | Saito et al. | |
| 6,361,069 B1 * | 3/2002 | Saito et al. ................ | 280/730.2 |
| 6,644,687 B2 * | 11/2003 | Saito et al. ................ | 280/730.2 |
| 7,198,300 B2 * | 4/2007 | Daume et al. ............. | 280/801.2 |
| 7,331,609 B2 * | 2/2008 | Uno et al. .................. | 280/801.2 |
| 7,497,473 B2 | 3/2009 | Sugimoto | |
| 8,240,712 B2 * | 8/2012 | Fukuzawa ..................... | 280/808 |
| 2005/0242563 A1 * | 11/2005 | Daume et al. ............. | 280/801.2 |
| 2005/0253366 A1 * | 11/2005 | Uno et al. .................. | 280/730.2 |
| 2007/0057501 A1 | 3/2007 | Downey | |
| 2007/0176408 A1 | 8/2007 | Clute | |

* cited by examiner

*Primary Examiner* — Ruth Ilan
*Assistant Examiner* — Barry Gooden, Jr.
(74) *Attorney, Agent, or Firm* — Global IP Counselors, LLP

(57) ABSTRACT

A vehicle pillar trim assembly includes a trim panel, a first cover plate and a second cover plate. The trim panel has a first side surface, a second side surface and an aperture extending from the first side surface to the second side surface. The first cover plate is slidably arranged in an adjustment direction with respect to the trim panel in an overlapping manner with the first side surface and at least partially covering the aperture. The first cover plate has a first opening that is smaller than the aperture and at least partially aligned with the aperture. The second cover plate is slidably with respect to the trim panel in an overlapping manner with the first cover plate and at least partially covering the first opening. The second cover plate has a second opening smaller than the first opening and aligned with the first opening.

27 Claims, 11 Drawing Sheets

VEHICLE PILLAR TRIM ASSEMBLY

BACKGROUND

1. Field of the Invention

The present invention generally relates to a pillar trim assembly that cooperates with a seat belt guiding assembly. More specifically, the present invention relates to a vehicle pillar trim assembly with a trim panel that includes an aperture and a cover assembly having a plurality of sliding plates that cover the aperture, the sliding plates moving in concert with a movable portion of a seat belt guiding assembly that extends through the aperture and corresponding apertures in each of the sliding plates.

2. Background Information

Airbags and curtain airbags have become standard equipment in vehicles. One challenge that faces vehicle manufactures, is finding subtle ways of concealing airbags without interfering with the inflation process of the airbag or interfering with operation of other components of the vehicle, such as doors, windows, seats and seat belts. Typically an airbag is concealed or packaged behind a frangible trim element or trim panel, where the frangible trim element or trim panel moves and/or breaks upon deployment of the airbag.

However, each vehicle design presents unique challenges with respect to concealing an airbag. Specifically, standard elements of a vehicle may require redesign in order to provide for improved packaging and concealment of an airbag.

SUMMARY

One object of the disclosure is to provide a trim panel with an overall shape that allows for easy and simple packaging of a curtain airbag above an upper end of the trim panel.

Another object of the disclosure is to provide a trim panel with a segmented cover assembly that minimizes the overall vertical space required to accommodate the cover assembly, in order to provide a maximized space for deployment of the curtain airbag.

In view of the state of the known technology, one aspect of the disclosure is a vehicle pillar assembly that includes a vehicle pillar, a seatbelt guiding assembly, a pillar trim panel and a cover assembly. The seat belt guiding assembly includes a seat belt guide and a positioning mechanism attached to the seat belt guide. The positioning mechanism is adjustably coupled to the vehicle pillar in a vertical direction to selectively position the seat belt guide relative to the vehicle pillar. The pillar trim panel is attached to the vehicle pillar and has a first side surface, a second side surface and an aperture extending from the first side surface to the second side surface. The cover assembly includes a first cover plate and a second cover plate. The first cover plate is slidably arranged in a first direction with respect to the pillar trim panel in an overlapping manner with the first side surface and at least partially covering the aperture. The first cover plate has a first opening that is smaller than the aperture and that is at least partially aligned with the aperture. The second cover plate is slidably arranged in the first direction with respect to the pillar trim panel in an overlapping manner with the first cover plate and at least partially covers the first opening. The second cover plate has a second opening that is smaller than the first opening and that is partially aligned with the first opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
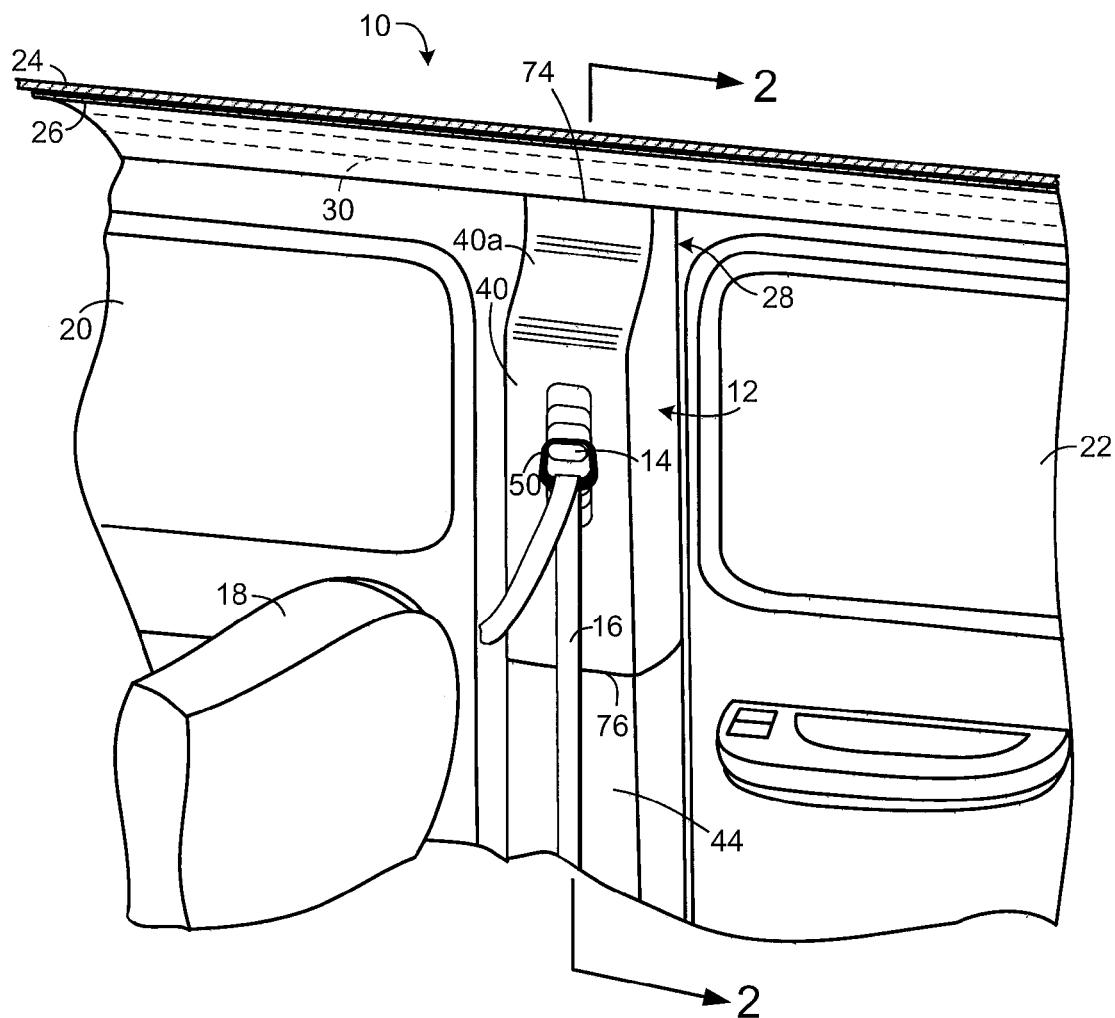
FIG. 1 is a perspective view of an interior wall and headliner of a vehicle passenger compartment, showing a pillar that includes a trim panel assembly, a seatbelt guiding assembly and a curtain airbag concealed above the trim panel assembly and behind a portion of a headliner in a stowed orientation in accordance with a first embodiment.

Referring initially to FIG. 1, a vehicle 10 having a pillar trim assembly 12 is illustrated in accordance with a first embodiment. As is described in greater detail below, the pillar trim assembly 12 is designed to cooperate with a seat belt guiding assembly 14. The seat belt guiding assembly 14 includes a seat belt 16 that is provided for use by a passenger seated within the vehicle 10. The pillar trim assembly 12 and the seat belt guiding assembly 14 are described in greater detail below, after a brief description of some related features of the vehicle 10.

FIG. 1 shows an interior of a passenger compartment of the vehicle 10, including a front seat 18, a front door 20, a rear side door 22, a roof structure 24, a headliner 26 and a pillar assembly 28 extending vertically between the front door 20 and the rear side door 22.

The front seat 18 is provided within the vehicle 10 to receive a passenger (not shown). The seat belt 16 is provided for restraining the passenger while riding within the vehicle 10. In the first embodiment depicted in FIGS. 1-8, the seat belt 16 is retained at a first end by a retracting device (not shown) that is fixedly attached to one of: a lower end of the pillar assembly 28, a lower end of the front seat 18 or the floor (not shown) of the vehicle 10. The seat belt 16 also has a second end that is similarly fixed to a portion of the front seat 18, the vehicle floor or a lower end of the pillar assembly 28 in a conventional manner, such that a clasp slidably disposed along the seat belt 16 can be fitted to a buckle (not shown) on the front seat 18 in a conventional manner. For example, a seat belt and seat belt retracting system is shown in greater detail in U.S. Pat. No. 7,364,200 (assigned to Nissan Technical Center North America, Inc.) and is incorporated herein by reference in its entirety. Operation and configurations of the retracting devices of seat belts are well known. Since seat belts and seat belt retracting devices, are conventional elements, further description is omitted for the sake of brevity.

The front seat 18, the front door 20 and the rear side door 22 are also conventional elements of the vehicle 10. Therefore, further description of the front seat 18, the front door 20 and the rear side door 22 is omitted for the sake of brevity.

The headliner 26 is installed to the roof structure 24 of the vehicle 10 in a conventional manner, and conceals a curtain airbag 30 and the pillar assembly 26, which extends vertically between the front door 20 and the rear side door 22.

Figure 2:
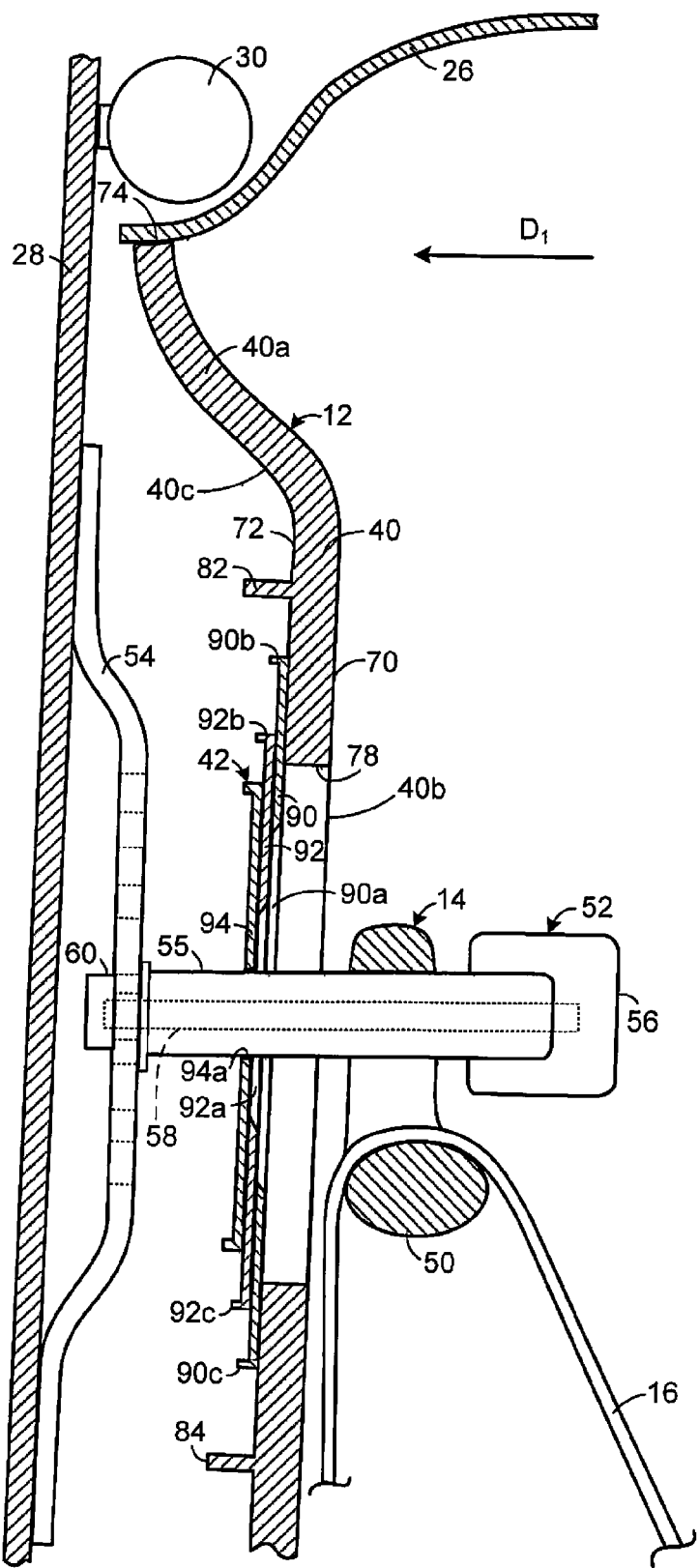
FIG. 2 is a cross-sectional view of the pillar and trim panel taken along the line 2-2 in FIG. 1, showing details of the seatbelt guiding assembly, a cover assembly of the trim panel assembly and the curtain airbag in the stowed orientation in accordance with the first embodiment.

The pillar assembly 28 is a conventional structure that includes a plurality of panels welded or otherwise rigidly fixed to one another to define a pillar structure. In FIG. 2, only an inner pillar panel of the pillar assembly 28 is shown. However, it should be understood from the drawings and the description herein that the pillar assembly 28 can include at least an inner pillar panel (shown in FIG. 2) and an outer pillar panel (not shown) to define the pillar assembly 28. Since pillar structures, such as the pillar assembly 28, are conventional structures, further description is omitted for the sake of brevity.

A description of the pillar trim assembly 12 is now provided with initial reference to FIGS. 2-8. The pillar trim assembly 12 is configured to cooperate with the seat belt guiding assembly 14 and the seat belt 16, and basically includes a trim panel 40 and a cover assembly 42. The pillar trim assembly 12 can also include a separate lower trim panel 44 covering a lower portion of the pillar assembly 28, with the trim panel 40 covering an upper portion of the pillar assembly 28.

Figure 3:
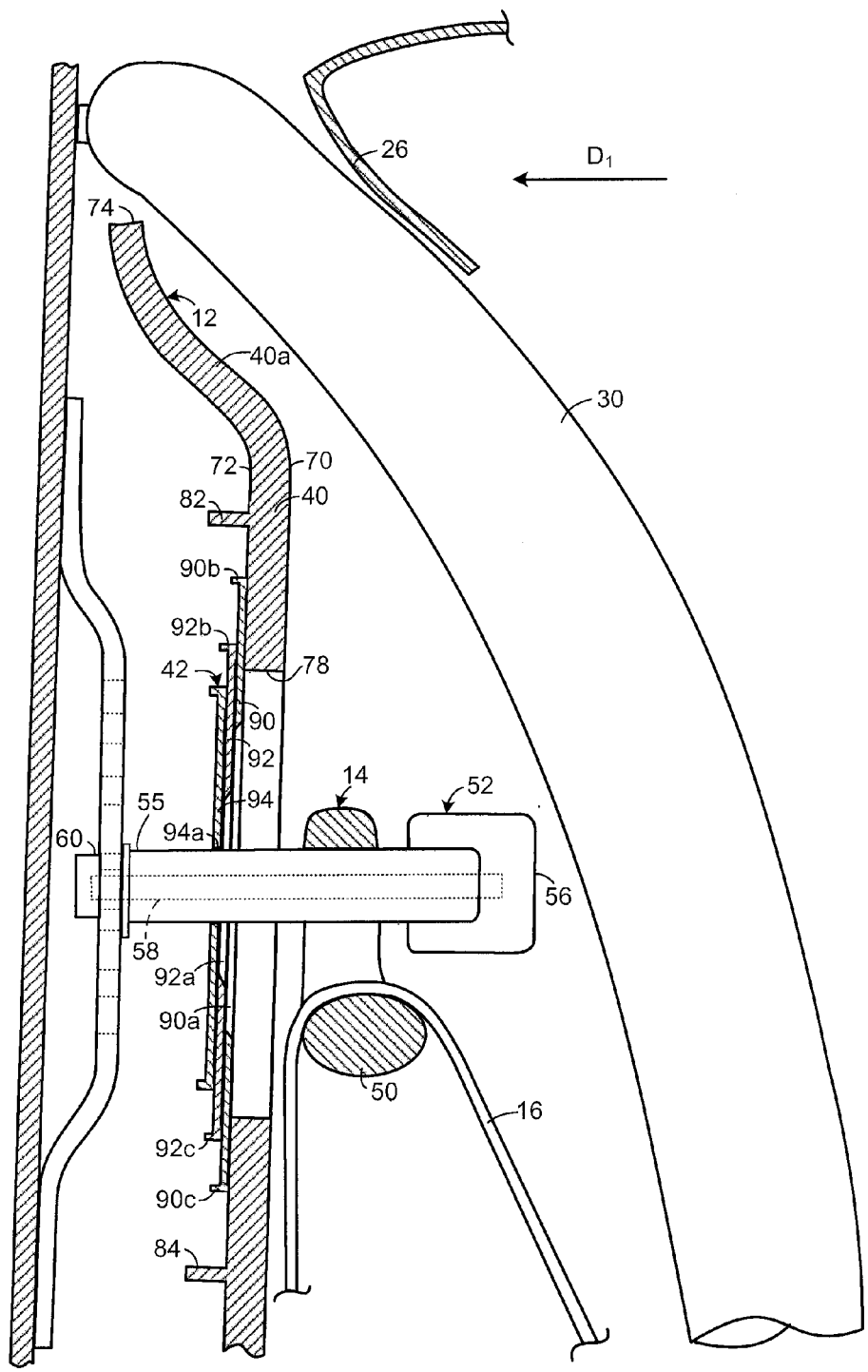
FIG. 3 is another cross-sectional view of the pillar and trim panel similar to FIG. 2, showing details of the seatbelt guiding assembly, the cover assembly of the trim panel assembly and the curtain airbag, with the curtain airbag in an inflated or deployed orientation in accordance with the first embodiment.

The pillar trim assembly 12 is configured such that an upper end portion 40a of the trim panel 40 extends in a vehicle outboard direction $D_1$, as indicated in FIGS. 2 and 3. More specifically, the upper end portion 40a minimizes the overall space occupied by the trim panel 40 within the passenger compartment of the vehicle 10.

As shown in FIG. 2 with the curtain airbag 30 in a stowed orientation, the curtain airbag 30 is disposed above the trim panel 40 with the entire curtain airbag 30 being located outboard of the cover assembly 42 or at least partially outboard of the cover assembly 42. As shown in FIG. 3 with the curtain airbag 30 in an inflated or deployed orientation, a portion of the curtain airbag 30 is located outboard of the cover assembly 42, with the remainder of the curtain airbag 30 extending downward to cover the pillar assembly 28, the windows of the front door 20, and the rear side door 22. Further, as is shown in FIG. 3, when the curtain airbag 30 is deployed, the overall shape and contour of the upper end portion 40a of the trim panel 40 provides unimpeded inflation of the curtain airbag 30 upon deployment.

In a conventional trim panel design, an upper end of a relatively straight trim panel would otherwise interfere with deployment of the curtain airbag, requiring the curtain airbag to be positioned at a location further inboard compared to the position of the curtain air bag 30 of the depicted embodiments, or other added components are required to guide the curtain air bag 30 past the upper end of the trim panel.

As is shown in FIG. 3, a portion of the headliner 26 is pushed away from the upper end portion 40a of the trim panel 40 by the curtain airbag when the curtain airbag 30 is deployed, in a conventional manner.

Figure 4:
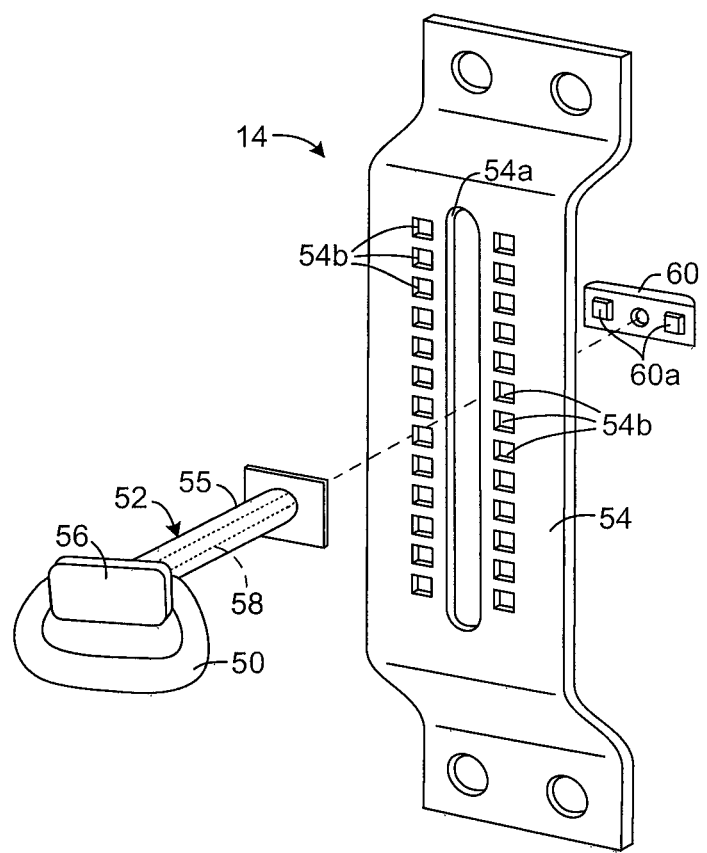
FIG. 4 is a perspective view of the seatbelt guiding assembly shown removed from the pillar and the trim panel assembly in accordance with the first embodiment.

As shown in FIG. 2-4, the seat belt guiding assembly 14 includes a seat belt guide 50 and a positioning mechanism 52 fixedly attached to the seat belt guide 50. The seat belt guide 50 is basically a ring made of metal or other rigid, strong material able to withstand the forces applied by the seat belt 16. As shown in FIGS. 1, 2 and 3, the seat belt 16 is looped through the seat belt guide 50.

The positioning mechanism 52 of the seat belt guiding assembly 14 can have any of a variety of shapes and configurations. The depiction of the seat belt guide 50 in FIG. 4 is one example of such positioning mechanisms. For example, as shown in FIG. 4, the positioning mechanism 52 includes a bracket 54, a tube portion 55, a release mechanism 56, a spring biased shaft 58 and a locking bar 60. The bracket 54 can have any of a variety of shapes and configurations. In the depicted configuration, the bracket 54 has a central slot 54a that extends vertically, and a plurality of stop holes 54b. The bracket 54 is bolted or otherwise fixedly attached to the pillar assembly 28, as indicated in FIGS. 2 and 3. Operation of the positioning mechanism 52 is similar to that disclosed in U.S. Pat. No. 6,276,720 (assigned to Nissan Motor Co. Ltd.), which is incorporated herein by reference in its entirety.

The tube portion 55 is hollow with the spring biased shaft 58 extending therethrough, and is disposed at an inboard side of the bracket 54, as shown in FIGS. 2 and 3. The tube portion 55 can slide vertically up and down along the bracket 54 in response to operation of the release mechanism 56. Further, the seat belt guide 50 is fixedly attached to the tube portion 55 proximate an inboard end of the tube portion 55, by, for example, welding.

The release mechanism 56 is basically a button fixed to one end of the spring biased shaft 58. The spring biased shaft 58 extends through an interior passage of the tube portion 55. The locking bar 60 includes a pair of stop projections 60a dimensioned to insert into any one of the plurality of pairs of stop holes 54b to prevent vertical movement of the positioning mechanism 52 relative to the bracket 54 and the pillar assembly 28. A second end of the spring biased shaft 58 is fixed to the locking bar 60, with the locking bar 60 being located along an outboard side of the bracket 54, as shown in FIGS. 2 and 3. A spring (not shown) biases the spring biased shaft 58 such that the locking bar 60 is biased into engagement with an outboard side of the bracket 54.

The positioning mechanism 52 operates as follows. The positioning mechanism 52 is adjustably coupled to the pillar assembly 28 to selectively position the seat belt guide 50 in a vertical direction relative to the pillar assembly 28. Specifically, a passenger presses on the release mechanism 56 (a button), causing the release mechanism 56 and the spring biased shaft 58 to move relative to the tube portion 55. The movement of the release mechanism 56 further causes the locking bar 60 to move away from the outboard side of the bracket 54 to release the stop projections 60a of the locking bar 60 from an adjacent pair of the stop holes 54b, allowing the tube portion 55 to slide vertically along the bracket 54, thereby allowing vertical positioning of the seat belt guide 50 relative to the pillar assembly 28. The biasing of the spring biased shaft 58 urges the locking bar 60 into engagement with the bracket 54 and thereby urges the stop projections 60a of the locking bar 60 into an adjacent pair of the stop holes 54b. The height of the seat belt guide 50 can thereby adjusted relative to the pillar assembly 28.

The trim panel 40 is has a first side surface 70, a second side surface 72, an upper end 74, a lower end 76 (FIG. 1 only) and an aperture 78 extending from the first side surface 70 to the second side surface 72. The first side surface 70 is an inboard or interior facing surface that can include a decorative outer coating or texture, such as a textile material, a leather-like material, or can have a textured surface to provide a desired appearance. The trim panel 40 is attached to the pillar assembly 26 in a conventional manner, by, for example, snap fitting projections (not shown) and/or fasteners (not shown).

Figure 8:
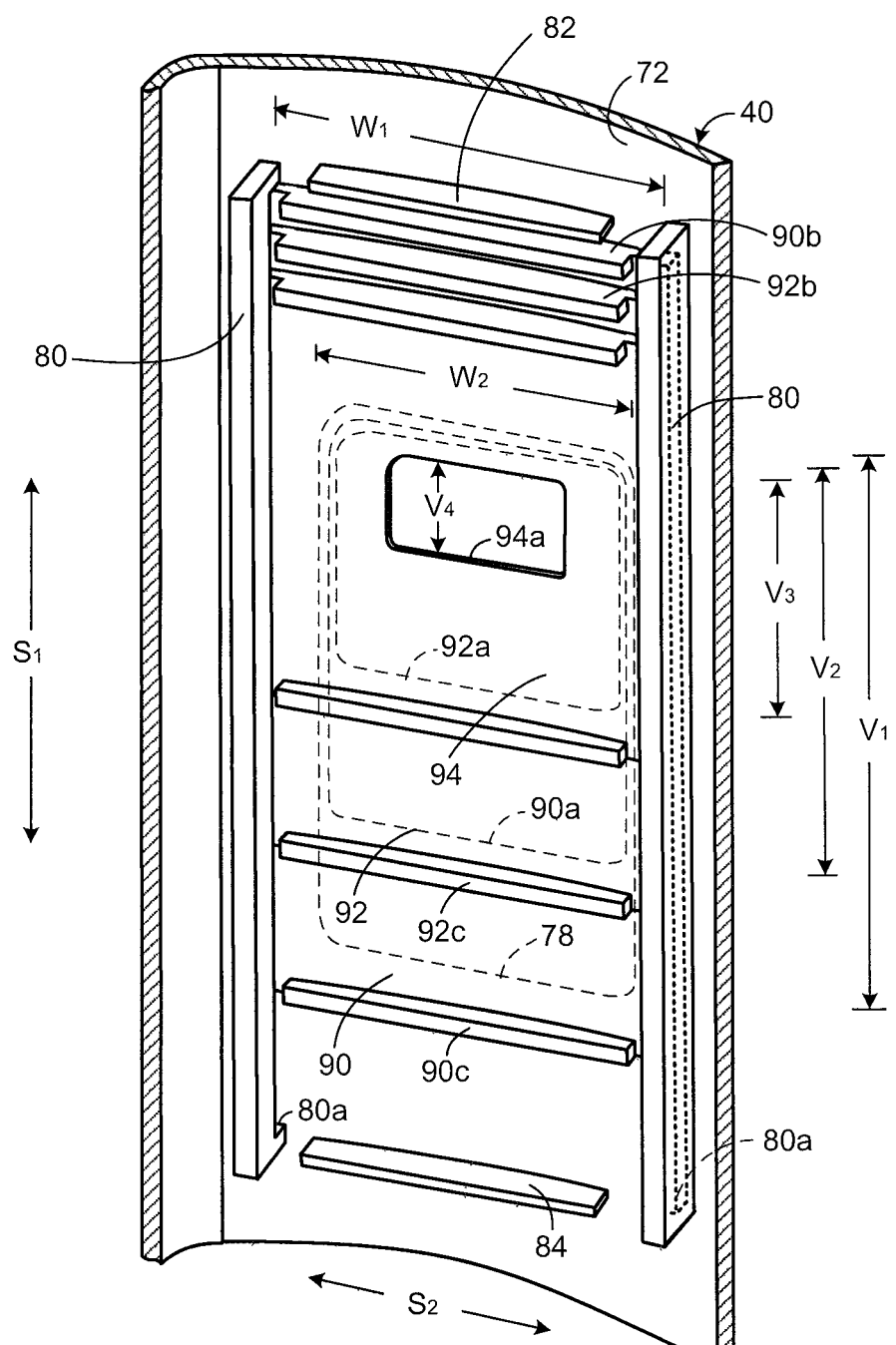
FIG. 8 is a perspective view of the trim panel and cover assembly showing a pillar facing side of the trim panel with the cover assembly in the first position, in accordance with the first embodiment.

The second side surface 72 is an outboard facing or pillar assembly facing surface that can include cover supporting tracks 80, a first stop projection 82 and a second stop projection 84, as shown in FIG. 8. As is described below in a description of the cover assembly 42, the cover supporting tracks 80 slidably support and retain the cover assembly 42. The first stop projection 82 defines an upper stopping location for movement of the cover assembly 42. The second stop projection 84 defines a lower stopping location for movement of the cover assembly 42.

The upper end 74 of the trim panel 40 defines an upper edge, with the upper end portion 40a of the trim panel 40 being located below the upper end 74, and above the aperture 78. More specifically, the upper end portion 40a is located above the first stop projection 82 and below the upper end 74 of the trim panel 40. The upper end portion 40a curves toward the outboard direction $D_1$ and extends upward and away from the aperture 78 such that at least a portion of the upper end portion 40a is located outboard of the cover assembly 42, as shown in FIG. 2. More specifically, a majority of the upper end portion 40a of the trim panel 40 is located outboard of the cover assembly 42. Further, the trim panel 40 includes a mid-section 40b that surrounds and defines the aperture 78. The mid-section 40b and the curvature of the upper end portion 40a of the trim panel 40 together define a concave area 40c along the second side surface 72 above the cover assembly 42 and the aperture 78. As well, the upper portion 40a extends outboard to overhang at least a portion of the cover assembly 42. Further, the upper portion 40a is located outboard relative to the majority of the first side surface 70 of the trim panel 40.

The cover assembly 42 of the first embodiment is shown in FIGS. 2, 3 and 5-7 and includes a first cover plate 90, a second cover plate 92 and a third cover plate 94. However, it should be understood from the drawings and the description herein, that there can be any of a variety of numbers of segmented cover plates that can be employed by the cover assembly 42. For example, there can be as few as two cover plates or as many as 12 or more cover plates. In a conventional cover assembly where only a single cover plate is employed, such as in U.S. Pat. No. 6,276,720 mentioned above, there must be sufficient vertical space above and below the aperture in the trim panel in order for the single sliding cover plate to move relative to the aperture. With a greater number of cover plates employed by the cover assembly 42, the vertical space above and below the aperture 78 is reduced and/or minimized. In other words, less space is required above the aperture 78 with a plurality of cover plates in the cover assembly 42, thereby making it possible to increase the size of the upper end portion 40a and improve the clearance space required for deployment of the curtain airbag 30.

Figure 5:
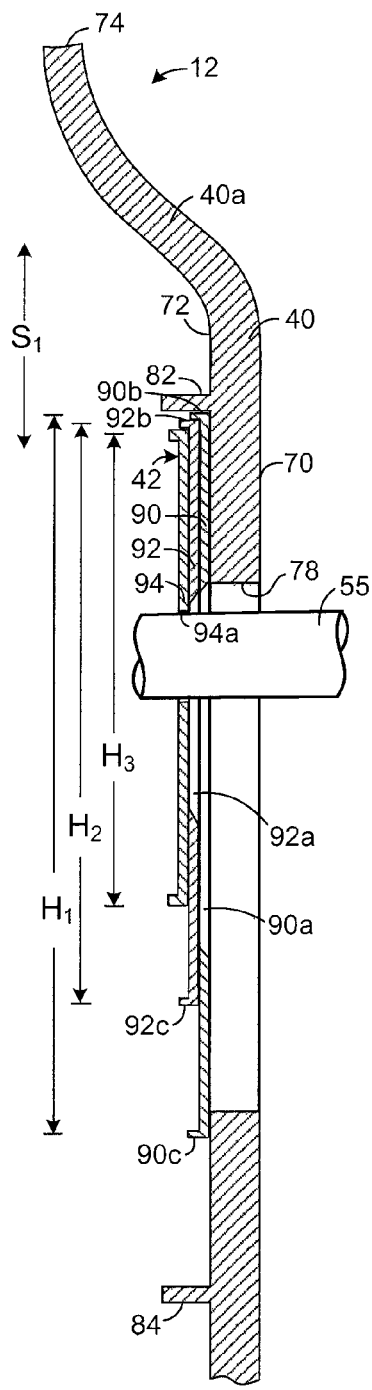
FIG. 5 is another cross-sectional view of the trim panel and cover assembly, with the cover assembly and a portion of the seatbelt guiding assembly in a first position, in accordance with the first embodiment.

As shown in FIG. 5, the first cover plate 90 has a vertical height $H_1$ (overall vertical length or vertical dimension), the second cover plate 92 has a vertical height $H_2$, and the third cover plate 94 has a vertical height $H_3$. As is also shown in FIG. 5, the vertical height $H_1$ is greater than the vertical height $H_2$ and the vertical height $H_3$. Further, the vertical height $H_2$ is greater than the vertical height $H_3$. The first cover plate 90 is disposed between the second cover plate 92 and the trim panel 40. Further, the first cover plate 90 is positioned to slide against and along the second side surface 72 of the trim panel 40. The second cover plate 92 is disposed between the third cover plate 94 and the first cover plate 90. Further, the second cover plate 92 is positioned to slide against and along the first cover plate 92. The third cover plate 94 is positioned to slide against and along the second cover plate 92.

The first cover plate 90 is slidably arranged in a first direction $S_1$ (FIG. 5) with respect to the pillar trim panel 40 in an overlapping manner with the second side surface 72 and at least partially covering the aperture 78. More specifically, as shown in FIG. 8, side edges of the first cover plate 90 extend into vertically extending grooves 80a of the cover supporting tracks 80. Thus, the first cover plate 90 is retained by the cover supporting tracks 80 to slide vertically in the first direction $S_1$ along the side surface 72 of the trim panel 40. Further, the first cover plate 90 includes a first opening 90a that is smaller than the aperture 78. Other than the first opening 90a, the first cover plate 90 completely covers the aperture 78. The first opening 90a is at least partially aligned with the aperture 78 in the trim panel 40.

Figure 6:
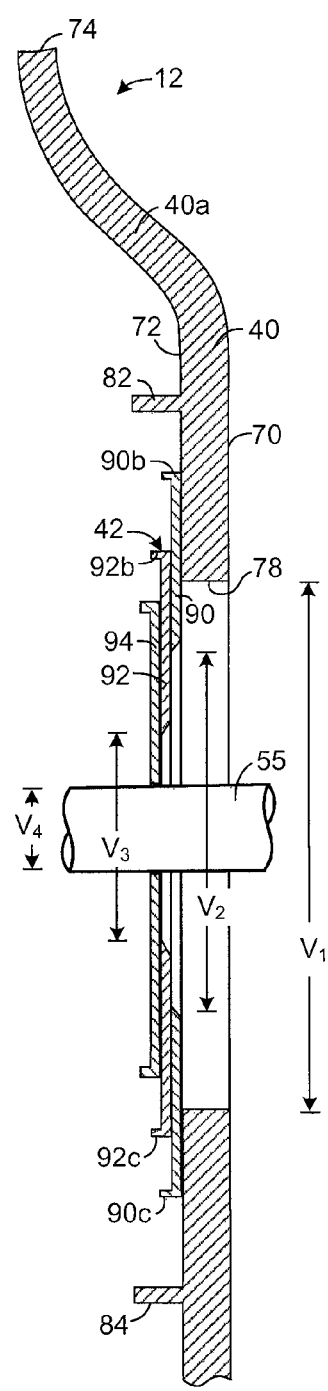
FIG. 6 is another cross-sectional view of the trim panel and cover assembly, with the cover assembly and a portion of the seatbelt guiding assembly in a second position, in accordance with the first embodiment.
Figure 7:
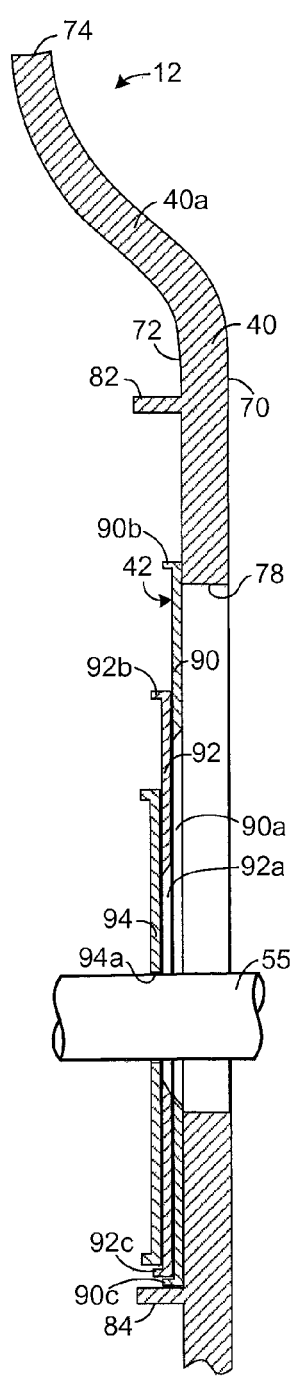
FIG. 7 is yet another cross-sectional view of the trim panel and cover assembly, with the cover assembly and a portion of the seatbelt guiding assembly in a third position, in accordance with the first embodiment.

The aperture 78 has a first vertical length $V_1$, as indicated in FIGS. 6 and 8. The first opening 90a has a second vertical length $V_2$, with the second vertical length $V_2$ being smaller than the first vertical length $V_1$. The first cover plate 90 also includes an upper projection 90b and a lower projection 90c. The upper and lower projections 90b and 90c extend in directions that are perpendicular to a main portion of the first cover plate 90 and limit sliding movement of the second cover plate 92 relative to the first cover plate 90. Specifically, when the second cover plate 92 moves upward relative to the first cover plate 90, an upper end of the second cover plate 92 contacts the upper projection 90b and is thereby prevented from moving upward beyond the upper projection 90b, as indicated in FIG. 5. Similarly, when the second cover plate 92 moves downward relative to the first cover plate 90, a lower end of the second cover plate 92 contacts the lower projection 90c and is thereby prevented from moving downward beyond the lower projection 90c, as indicated in FIG. 7.

The second cover plate 92 is slidably arranged in the first direction $S_1$ (FIG. 5) with respect to the pillar trim panel 40 and the first cover plate 90 in an overlapping manner with the first cover plate 90 and at least partially covers the first opening 90a of the first cover plate 90. More specifically, as shown in FIG. 8, side edges of the second cover plate 92 extend into the vertically extending grooves 80a of the cover supporting tracks 80. Thus, the second cover plate 92 is retained by the cover supporting tracks 80 to slide vertically in the first direction $S_1$ along an adjacent surface of the first cover plate 90 parallel to the trim panel 40. Further, the second cover plate 92 includes a second opening 92a that is smaller than the aperture 78 of the trim panel 40 and smaller that the first opening 90a of the first cover plate 90. Other than the second opening 92a, the second cover plate 92 completely covers the first opening 90a of the first cover plate 90. The second opening 92a is at least partially aligned with the aperture 78 in the trim panel 40 and the first opening 90a of the first cover plate 90.

The second opening 92a has a third vertical length $V_3$, as indicated in FIGS. 6 and 8. The second opening 92a is smaller than the first opening 90a. More specifically, the third vertical length $V_3$ is smaller than the second vertical length $V_2$ and smaller than the first vertical length $V_1$. The second cover plate 92 also includes an upper projection 92b and a lower projection 92c. The upper and lower projections 92b and 92c extend in directions that are perpendicular to a main body of the second cover plate 92 and limit movement of the third cover plate 94 relative to the second cover plate 92. Specifically, when the third cover plate 94 moves upward relative to the second cover plate 92, an upper end of the third cover plate 94 contacts the upper projection 92b and is thereby prevented from moving upward beyond the upper projection 92b, as indicated in FIG. 5. Similarly, when the third cover plate 94 moves downward relative to the second cover plate 92, a lower end of the third cover plate 94 contacts the lower projection 92c and is thereby prevented from moving downward beyond the lower projection 92c, as indicated in FIG. 7.

The third cover plate 94 is slidably arranged in the first direction $S_1$ (FIG. 5) with respect to the pillar trim panel 40, the first cover plate 90 and the second cover plate 92 in an overlapping manner with the second cover plate 92 and at least partially covers the second opening 92a of the second cover plate 92. More specifically, as shown in FIG. 8, side edges of the third cover plate 94 extend into the vertically extending grooves 80a of the cover supporting tracks 80. Thus, the third cover plate 94 is retained by the cover supporting tracks 80 to slide vertically in the first direction $S_1$ along an adjacent surface of the second cover plate 92 parallel to the first cover plate 90 and the trim panel 40. Further, the third cover plate 94 includes a third opening 94a that is smaller than the aperture 78 of the trim panel 40, smaller that the first opening 90a of the first cover plate 90 and smaller than the second opening 92a of the second cover plate 92. Other than the third opening 94a, the third cover plate 94 covers the second opening 92a of the second cover plate 92. The third opening 94a is at least partially aligned with the aperture 78 in the trim panel 40, the first opening 90a of the first cover plate 90 and the second opening 92a of the second cover plate 92.

The third opening 94a has a fourth vertical length $V_4$, as indicated in FIGS. 6 and 8. The third opening 94a is smaller than the second opening 92a. More specifically, the fourth vertical length $V_4$ is smaller than the third vertical length $V_3$, smaller than the second vertical length $V_2$ and smaller than the first vertical length $V_1$.

The first direction $S_1$ corresponds to an adjustment direction of the seat belt guiding assembly 14. Specifically, the tube portion 55 of the seat belt guide assembly 50 is adjustable to a plurality of vertical positions such that the tube portion 55 and the positioning mechanism 52 move in the first direction $S_1$. As described above, the cover assembly 42 is slidably attached to the trim panel 40. Specifically, the tube portion 55 extends through the third opening 94a such that the third cover plate 94 of the cover assembly 42 moves simultaneously with movement of the tube portion 55 of the seat belt guiding assembly 14. The tube portion 55 can be shaped and dimensioned to correspond to the shape and dimension of the third opening 94a. Thus, with the tube portion 55 extending through the third opening 94a, the third cover plate 94 moves in concert with the tube portion 55. Alternatively, the tube portion 55 can be fixedly attached to the third cover plate 94 such that the third cover plate 94 moves in concert with the tube portion 55.

The vertical height $H_1$ of the first cover plate 90 is greater than the first vertical length $V_1$ of the aperture 78 of the trim panel 40. Therefore, the first cover plate 90 (except for the first opening 90a) covers the aperture 78 of the trim panel 40. Similarly, the vertical height $H_2$ of the second cover plate 92 is greater than the second vertical length $V_2$ of the first opening 90a of the first cover plate 90. Therefore, the second cover plate 92 (except for the second opening 92a) covers the first opening 90a of the first cover plate 90. As well, the vertical height $H_3$ of the third cover plate 94 is greater than the third vertical length $V_3$ of the second opening 92a of the second cover plate 92. Therefore, the third cover plate 94 (except for the third opening 94a) covers the second opening 92a of the second cover plate 92.

Further, as is shown in FIG. 8, the first cover plate 90, the second cover plate 92 and the third cover plate 94 of the cover assembly 42 are each provided with a width $W_1$ measured in a second direction $S_2$. The direction $S_2$ is perpendicular to the first direction $S_1$ (the adjustment direction). The widths $W_1$ are all larger than a width $W_2$ of the aperture 78 of the trim panel 40 measured in a direction $S_2$.

As is shown in FIG. 5, with the tube portion 55 of the seat belt guiding assembly 14 moved to its upper most position, the first, second and third cover plates 90, 92 and 94 are also moved upward to each of their corresponding uppermost positions. More specifically, an upper edge of the third cover plate 94 is located either aligned with or offset below the upper edge of the second cover plate 92. Further, an upper edge of the second cover plate 92 is located either aligned with or offset below the upper edge of the first cover plate 90 with the cover assembly 42 in its uppermost position.

As is shown in FIG. 7, with the tube portion 55 of the seat belt guiding assembly 14 moved to its lower most position, the first, second and third cover plates 90, 92 and 94 are also moved downward to each of their corresponding lowermost positions. More specifically, a lower edge of the third cover plate 94 is located either aligned with or offset above the lower edge of the second cover plate 92. Further, a lower edge of the second cover plate 92 is located either aligned with or offset above the lower edge of the first cover plate 90 with the cover assembly 42 in its lowermost position.

As described above, the cover assembly 42 constitutes a segmented cover assembly, with a plurality of cover members moving with the seat belt guiding assembly 14 as the seat belt guiding assembly 14 is adjusted for the height of a passenger using the seat belt 16. In a conventional trim panel that includes a single cover covering an aperture in the trip panel, the trim panel must have sufficient room above and below the aperture to provide for the sliding movement of the single cover. The inclusion of the above described cover assembly 42 having a plurality of cover plates, reduces the required cover movement space above and below the aperture 78, as compared the conventional trim panel with only a single cover plate.

The segmented cover assembly 42 described herein allows for design of the trim panel 40 to include the upper end portion 40a, which extends in the vehicle outboard direction $D_1$, as the trim panel 40 extends upward. Hence, at least a section of the upper end portion 40a is located outboard relative to the cover assembly 42 and outboard relative to the first side surface 70 of the trim panel 40. As well, a portion of the upper end portion 40a overhangs the first, second and third cover plates 90, 92 and 94. Further, the curtain airbag 30 concealed behind an outboard section of the headliner 26, is provided with a clear and unobstructed space below the headliner 26 such that the curtain airbag 30 can deploy downward without interference with the trim panel 40 covering the pillar assembly 28. Further, as shown in FIG. 1, a single curtain airbag 30 can extend over the front door 20, the pillar assembly 28 and over the rear side door 22. Whereas, in conventional vehicle structures, two separate curtain airbags are typically installed in a vehicle, with one curtain airbag being installed above the front door and a second curtain airbag being installed above the rear side door in order to avoid interference from a pillar structure between the front and rear side doors.

In the above described first embodiment, the curtain airbag 30 is disposed above the trim panel 40 with at least a portion of the curtain airbag 30 being located inboard of the upper end 74 (an upper edge) of the trim panel 40, as shown in FIGS. 2 and 3.

In the first (and second) embodiment, the first, second and third cover plates 90, 92, 94 have a straight profile in an upright direction. In the horizontal direction, the first, second and third cover plates 90, 92, 94 (and 94') can include a slight curvature. However, it should be understood from the drawings and the description herein that each of the first, second and third cover plates 90, 92, 94 can include upright surfaces that are flat. Specifically, the surfaces of the first and second plates 90 and 92 that contact one another and slide relative to one another can be flat, and the surfaces of the second and third plates 92 and 94 that contact one another and slide relative to one another can be flat.

Second Embodiment

Figure 9:
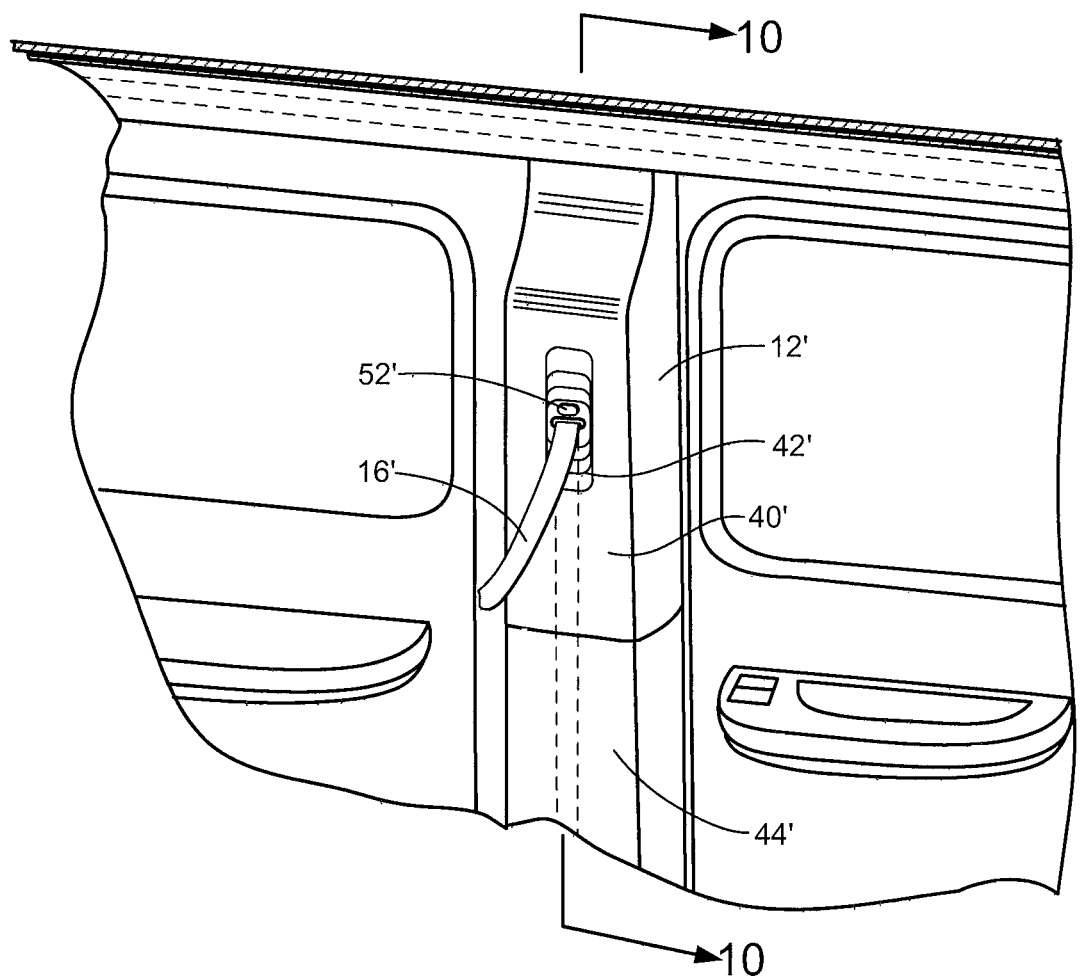
FIG. 9 is a perspective view of an interior wall and headliner of a vehicle passenger compartment, showing a pillar that includes a trim panel, a seatbelt guiding assembly and a curtain airbag concealed above the trim panel behind a portion of the headliner in accordance with a second embodiment.
Figure 10:
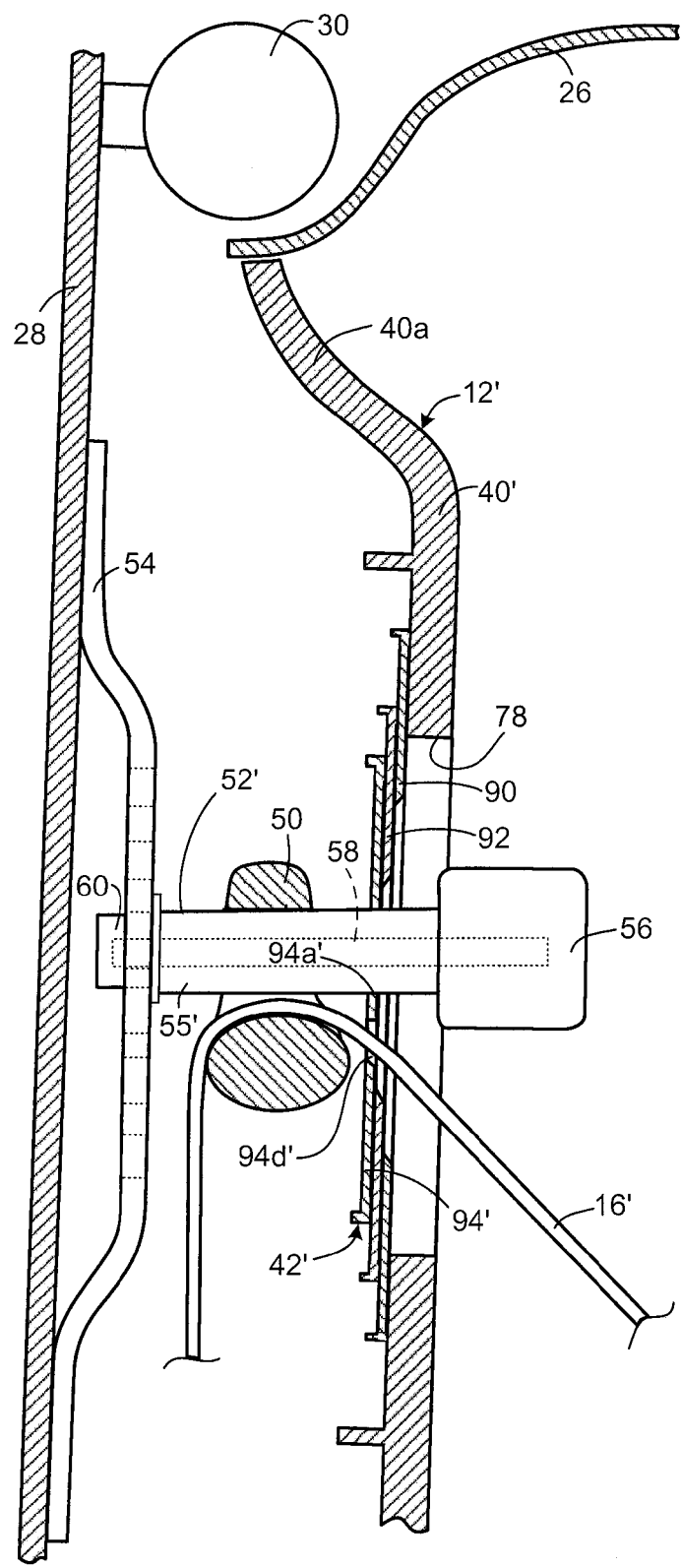
FIG. 10 is a cross-sectional view of the pillar and trim panel taken along the line 10-10 in FIG. 9, showing details of the seatbelt guiding assembly, a cover assembly of the trim panel and the curtain airbag in accordance with the second embodiment.

Referring now to FIGS. 9 and 10, a pillar trim assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the pillar trim assembly 12' includes a modified seat belt 16', a modified trim panel 40', a modified cover assembly 42', a modified lower trim panel 44' and a modified positioning mechanism 52' that includes many of the features of the positioning mechanism 52 of the first embodiment.

In the second embodiment, the seat belt 16' includes a conventional retracting mechanism (not shown) that is concealed between the pillar assembly 28 and the modified lower trim panel 44'. Specifically, the modified lower trim panel 44' conceals the seat belt retracting mechanism. Therefore, the seat belt 16' extends through the aperture 78 of the trim panel 40'.

In the second embodiment, the modified cover assembly 42' includes the first cover plate 90 and the second cover plate 92 of the first embodiment, but further includes a modified third cover plate 94'. The modified third cover plate 94' has all the features of the third cover plate 94 of the first embodiment, but further includes an additional opening 94d' such that the seat belt 16' extends through the aperture 94d'. Alternatively, the third opening 94a' of the modified third cover plate 94' can be large enough and configured to allow the seat belt 16' pass through the opening 94a'.

The positioning mechanism 52' includes the seat belt guide 50, the bracket 54, the release mechanism 56, the spring biased shaft 58 and the locking bar 60 of the first embodiment. However, the tube portion 55 is replaced with a tube portion 55' in the second embodiment. The tube portion 55' is modified in that the seat belt guide 50 is fixedly attached to a mid-region of the tube portion 55' in order to be concealed between the pillar assembly 28 and the trim panel 40' and accommodate the movement of the seat belt 16' to and from the seat belt retracting mechanism (not shown).

Third Embodiment

Figure 11:
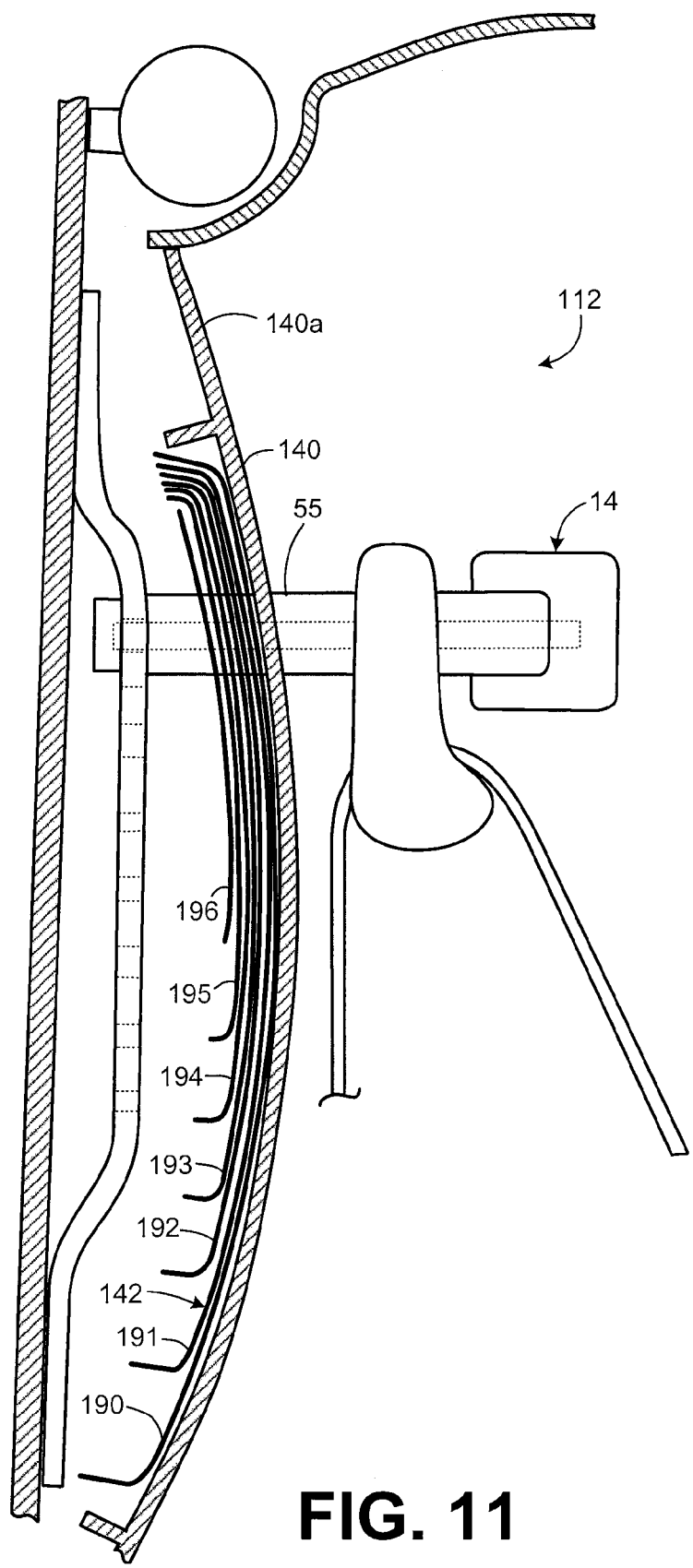
FIG. 11 is a cross-sectional view of a pillar and a trim panel taken similar to FIG. 2, showing details of a seatbelt guiding assembly, a cover assembly of the trim panel and the curtain airbag in accordance with a third embodiment.
Figure 12:
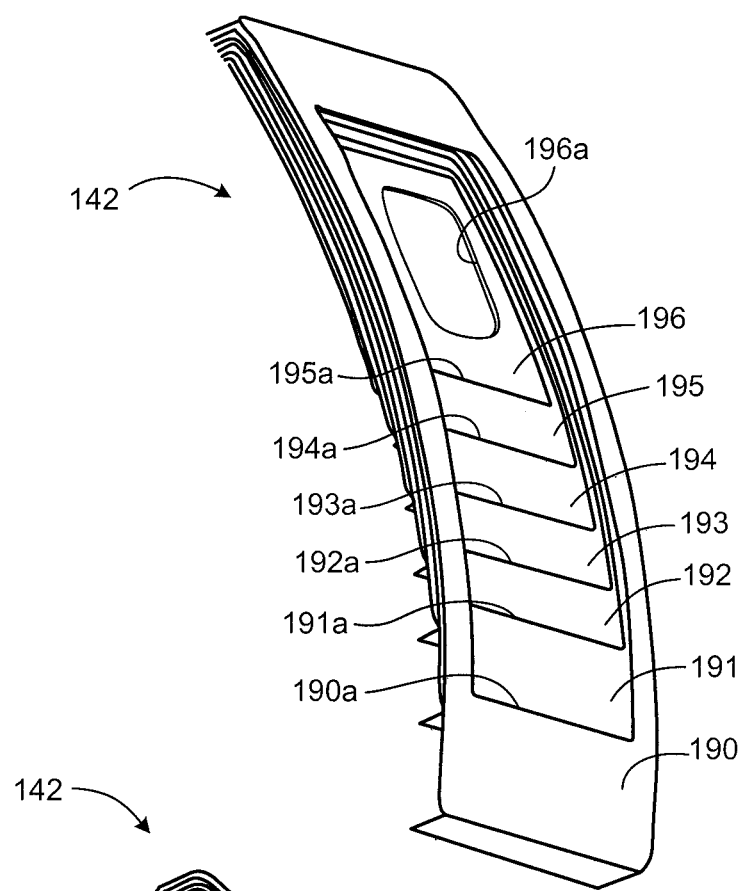
FIG. 12 is a perspective view of a passenger facing side of the cover assembly shown removed from the trim panel depicted in FIG. 11, showing details of the various plates that comprise the cover assembly in accordance with the third embodiment.
Figure 13:
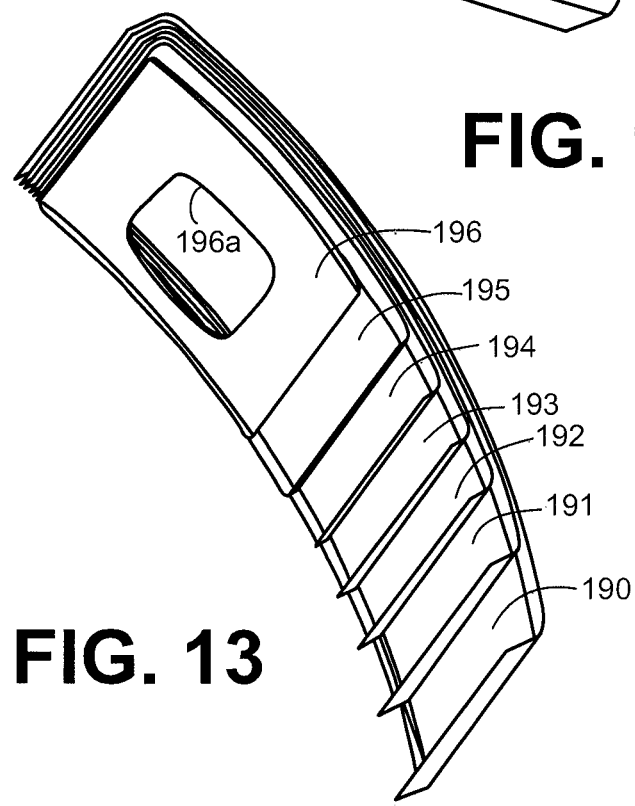
FIG. 13 is another perspective view of the cover assembly shown removed from the trim panel depicted in FIG. 11, showing details of a pillar facing side of the various plates that comprise the cover assembly in accordance with the third embodiment.

Referring now to FIGS. 11, 12 and 13, a pillar trim assembly 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the pillar trim assembly 112 includes the seat belt guiding assembly 14 of the first embodiment, a trim panel 140 and a cover assembly 142. The seat belt guiding assembly 14 is as described above with respect to the first embodiment.

The trim panel 140 has an overall curved contour in cross-section, as shown in FIG. 11. An upper end portion 140a curves upward in an outboard direction such that the upper end portion 140a overhangs at least a portion of the cover assembly 142. Further, with the seat belt guiding assembly 14 in an uppermost position (as shown in FIG. 11) the upper end portion 140a overhangs a majority of the cover assembly 142.

The cover assembly 142 includes a plurality of cover plates 190, 191, 192, 193, 194, 195 and 196. Each of the cover plates 190, 191, 192, 193, 194, 195 and 196 overlays an adjacent one of the cover plates and have graduated heights, with the cover plate 190 being the longest and the cover plate 196 being the shortest of the cover plates. Each of the cover plates 190, 191, 192, 193, 194, 195 and 196 has a curved contour from as seen from their common edges in FIG. 11. Each of the cover plates 190, 191, 192, 193, 194, 195 and 196 slides against the surface of the adjacent one of the cover plates. Each of the cover plates 190, 191, 192, 193, 194, 195 and 196 includes a corresponding opening dimensioned in a manner consistent with the openings in the cover plates 90, 92 and 94 of the first embodiment. Specifically as shown in FIG. 12, the cover plate 190 includes an opening 190a, the cover plate 191 includes an opening 191a, the cover plate 192 includes an opening 192a, the cover plate 193 includes an opening 193a, the cover plate 194 includes an opening 194a, the cover plate 195 includes an opening 195a and the cover plate 196 includes an opening 196a. The opening 196a is dimensioned to receive the tube portion 55 of the positioning mechanism of the seat belt guiding assembly 14 such that the cover plate 196 moves in concert with movement of the tube portion 55.

Fourth Embodiment

Figure 14:
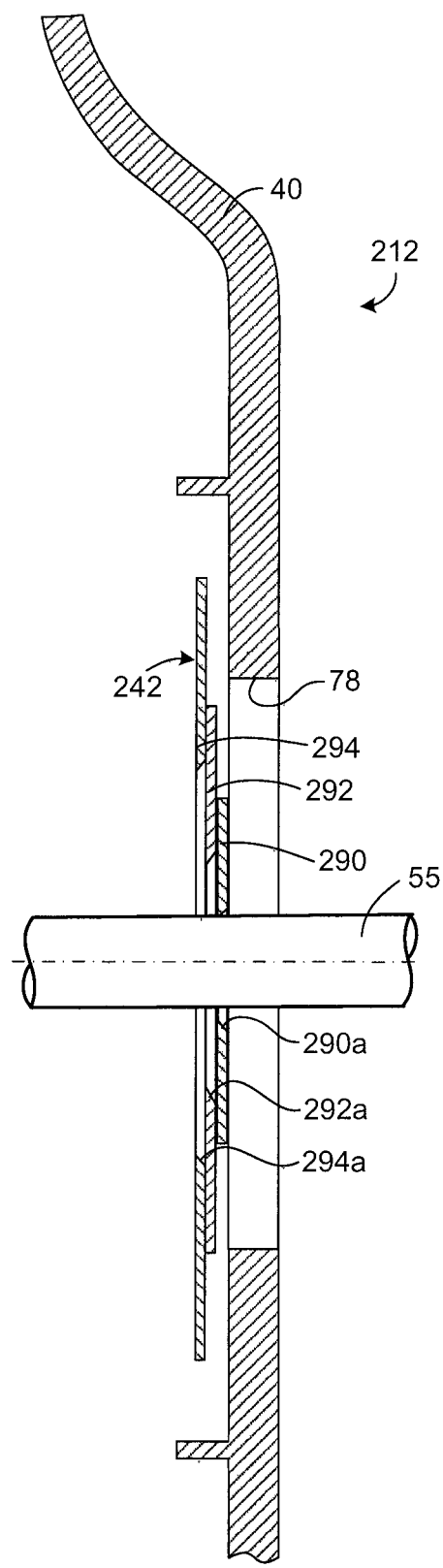
FIG. 14 is a cross-sectional view of a trim panel showing details of a cover assembly in accordance with a fourth embodiment.

Referring now to FIG. 14, a portion of a pillar trim assembly 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the pillar trim assembly 212 includes the trim panel 40 and a cover assembly 242. The cover assembly 242 includes a first cover plate 290, a second cover plate 292, and a third cover plate 294. The cover plates 290, 292 and 294 are all wider than the aperture 78 of the trim panel 40. The cover plate 290 has a vertical height that is shorter that the vertical height of the aperture 78. The vertical height of the cover plate 292 is greater than the vertical height of the cover plate 290, but is smaller than the vertical height of the cover plate 294.

Further the cover plate 290 is located between the trim panel 40 and the cover plate 292. The cover plate 292 is located between the cover plate 294 and the cover plate 290. The tube portion 55 of the seat belt guiding assembly 14 in the fourth embodiment extends through the opening 290a of the cover plate 290 such that the cover plate 290 moves with the tube portion 55.

Although not shown for the sake of brevity, the pillar trim assembly 212 also includes a seat belt and a seat belt guiding assembly 14 as described above in the first embodiment.

As is shown in the fourth embodiment, the cover assembly 242 can include a plurality of cover plates where the smallest one of the cover plates, the cover plate 290 is disposed between the trim panel 40 and a larger cover plate, such as the cover plate 292.

The vehicle 10 includes many conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the pillar trim assembly 12. Accordingly, these terms, as utilized to describe the present invention should be interpreted relative to a vehicle equipped with the pillar trim assembly 12.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle pillar trim assembly comprising
a pillar trim panel having an outboard surface including a stop projection, an inboard surface, an upper edge and a mid-section defining an aperture, the aperture extending from the outboard surface to the inboard surface, with an upper portion of the pillar trim panel extending from the upper edge of the pillar trim panel toward the aperture, the upper portion being located above the stop projection and extending in an outboard direction from the mid-section;
a first cover plate slidably arranged in an adjustment direction with respect to the pillar trim panel in an overlapping manner with the outboard surface and at least partially covering the aperture, the first cover plate having a first opening that is smaller than the aperture and that is at least partially aligned with the aperture; and
a second cover plate slidably arranged in the adjustment direction with respect to the pillar trim panel in an overlapping manner with the first cover plate and at least partially covering the first opening, the second cover plate having a second opening that is smaller than the first opening and that is partially aligned with the first opening, the stop projection defining an upper stopping location for movement of the first and second cover plates.

2. The vehicle pillar trim assembly according to claim 1, wherein
the aperture has a first vertical length, and
the first cover plate has a second vertical length that is greater than the first vertical length such that the first cover plate covers the aperture of the pillar trim panel.

3. The vehicle pillar trim assembly according to claim 2, wherein
the first opening of the first cover plate has a third vertical length, and the second cover plate has a fourth vertical length that is greater than the third vertical length such that the second cover plate covers the first opening of the first cover plate.

4. The vehicle pillar trim assembly according to claim 1, wherein
the first cover plate is arranged between the outboard surface of the pillar trim panel and the second cover plate.

5. The vehicle pillar trim assembly according to claim 4, wherein
the second cover plate is shorter than the first cover plate as measured in the adjustment direction.

6. The vehicle pillar trim assembly according to claim 1, wherein
the first cover plate is larger than the aperture as measured in a direction perpendicular to the adjustment direction.

7. The vehicle pillar trim assembly according to claim 1, wherein
the upper portion extends outboard to overhang at least the first cover plate with the pillar trim panel in an installed orientation.

8. The vehicle pillar trim assembly according to claim 7, wherein
the upper portion overhangs both the first and the second cover plates with the pillar trim panel in an installed orientation.

9. The vehicle pillar trim assembly according to claim 7, further comprising
an airbag disposed above the pillar trim panel with a majority of the airbag being located inboard of the upper edge of the pillar trim panel.

10. The vehicle pillar trim assembly according to claim 1, further comprising
a third cover plate slidably arranged in the adjustment direction with respect to the pillar trim panel in an overlapping manner with the second cover plate, and at least partially covering the second opening, the third cover plate having a third opening that is smaller than the second opening and that is partially aligned with the second opening.

11. The vehicle pillar trim assembly according to claim 1, wherein
the first and the second cover plates have upper edges, respectively, the upper edge of the second cover plate is located either aligned with or offset below the upper edge of the second cover plate with the first and the second cover plates located in an upper most position.

12. The vehicle pillar trim assembly according to claim 1, wherein
the mid-section of the pillar trim panel is planar as viewed in cross-section.

13. The vehicle pillar trim assembly according to claim 1, wherein
the mid-section of the pillar trim panel is curved as viewed in cross-section.

14. The vehicle pillar trim assembly according to claim 1, wherein
the upper portion is curved in the outboard direction such that the upper portion defines a concave area along the outboard surface.

15. A vehicle pillar assembly comprising
a vehicle pillar;
a seat belt guiding assembly including a seat belt guide and a positioning mechanism attached to the seat belt guide, the positioning mechanism being adjustably coupled to the vehicle pillar in a vertical direction to selectively position the seat belt guide relative to the vehicle pillar;
a pillar trim panel attached to the vehicle pillar having an outboard surface including a stop projection, an inboard surface, an upper edge and a mid-section defining an aperture, the aperture extending from the outboard surface to the inboard surface, with an upper portion of the pillar trim panel extending from the upper edge of the pillar trim panel toward the aperture, the upper portion being located above the stop projection and extending in an outboard direction from the mid-section such that the upper edge of the pillar trim panel is located outboard relative to the mid-section;
an airbag with at least a portion of the airbag being positioned inboard of the upper edge of the pillar trim panel; and
a cover assembly including:
a first cover plate slidably arranged in a adjustment direction with respect to the pillar trim panel in an overlapping manner with the outboard surface and at least partially covering the aperture, the first cover plate having a first opening that is smaller than the aperture and that is at least partially aligned with the aperture, and
a second cover plate slidably arranged in the adjustment direction with respect to the pillar trim panel in an overlapping manner with the first cover plate and at least partially covering the first opening, the second cover plate having a second opening that is smaller than the first opening and that is partially aligned with the first opening, the stop projection defining an upper stopping location for movement of the first and second cover plates.

16. The vehicle pillar assembly according to claim 15, wherein
the positioning mechanism is coupled to the second plate for movement therewith.

17. The vehicle pillar assembly according to claim 15, wherein
the second cover plate is arranged between the outboard surface of the pillar trim panel and the first cover plate.

18. The vehicle pillar trim assembly according to claim 17, wherein
the second cover plate is shorter than the first cover plate as measured in the adjustment direction.

19. The vehicle pillar trim assembly according to claim 15, wherein
the first cover plate is arranged between the outboard surface of the pillar trim panel and the second cover plate.

20. The vehicle pillar trim assembly according to claim 19, wherein
the second cover plate is shorter than the first cover plate as measured in the adjustment direction.

21. The vehicle pillar trim assembly according to claim 15, wherein
the upper portion of the pillar trim panel overhang at least the first cover plate.

22. The vehicle pillar trim assembly according to claim 21, wherein
the upper portion overhangs both the first and the second cover plates.

23. The vehicle pillar trim assembly according to claim 21, further comprising
an airbag disposed above the pillar trim panel with at least a portion of the airbag being located inboard of the first cover plate such that the upper portion of the pillar trim panel provides unimpeded inflation of the airbag upon deployment.

24. The vehicle pillar trim assembly according to claim 15, further comprising
a third cover plate slidably arranged in the adjustment direction with respect to the pillar trim panel in an overlapping manner with the second cover plate, and at least partially covering the second opening, the third cover plate having a third opening that is smaller than the second opening and that is partially aligned with the second opening, the seat belt guide being coupled to the third plate for movement therewith.

25. The vehicle pillar trim assembly according to claim 15, further comprising an airbag disposed above the pillar trim panel with a majority of the airbag being located inboard of the upper portion of the pillar trim panel such that the upper portion of the pillar trim panel provides unimpeded inflation of the airbag upon deployment.

26. The vehicle pillar trim assembly according to claim 15, further comprising an airbag disposed above the pillar trim panel directly adjacent to the upper portion of the trim panel in the absence of any elements therebetween, the upper portion of the pillar trim panel being positioned to provide unimpeded inflation of the airbag upon deployment.

27. The vehicle pillar trim assembly according to claim 15, wherein the upper portion is curved in the outboard direction such that the upper portion defines a concave area along the outboard surface.

* * * * *